July 26, 1932.  E. S. EVANS  1,869,054
DECKING STRUCTURE
Filed April 9, 1931
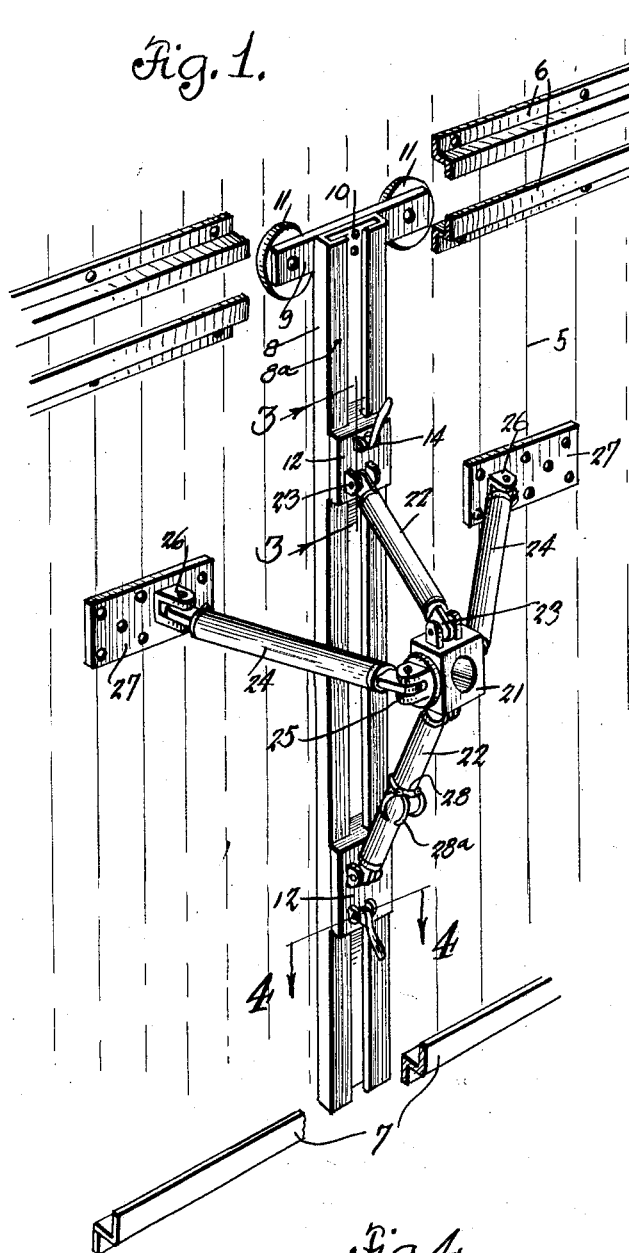
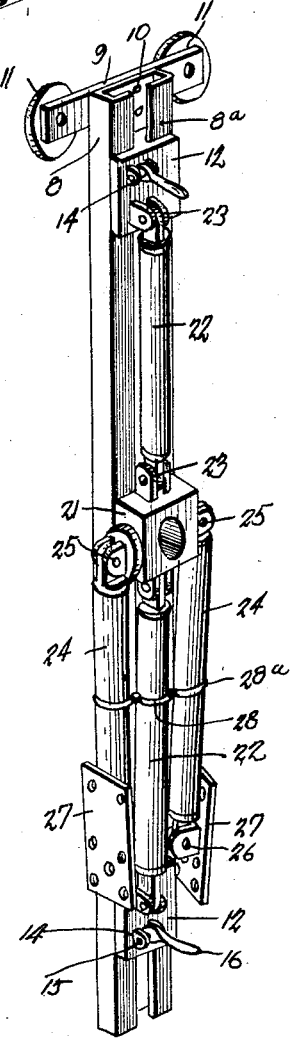
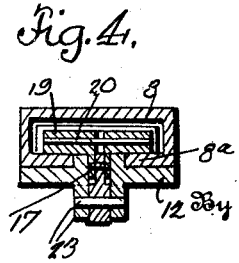
Inventor
Edward S. Evans.
By
Bryant
Attorneys Patented July 26, 1932

1,869,054

UNITED STATES PATENT OFFICE

EDWARD S. EVANS, OF DETROIT, MICHIGAN, ASSIGNOR TO EVANS PRODUCTS COMPANY, OF DETROIT, MICHIGAN, A CORPORATION OF DELAWARE

DECKING STRUCTURE

Application filed April 9, 1931. Serial No. 528,935.

This invention relates to certain new and useful improvements in decking structures.

The primary object of the invention is to provide a decking structure associated with a wall of a freight car or other conveyance to be utilized in the transportation of motor vehicles, the decking structure being of a character to permit shifting movement longitudinally of a car wall for positioning purposes while the vehicle supporting head of the structure is both vertically and transversely adjustable to vary the height of the decking structure and to associate the same with motor vehicles varying in width.

A further object of the invention is to provide a decking structure for the shipment of motor vehicles wherein a hanger is adjustable longitudinally of a car wall with a deck head vertically and laterally adjustable upon the hanger to accommodate positioning thereof for the support of a motor vehicle.

It is a further object of the invention to provide a decking structure of the foregoing character wherein the several parts thereof that are pivotally or hingedly connected together may be moved to positions of substantial parallelism for occupying a minimum of space when out of use.

With the above and other objects in view that will become apparent as the nature of the invention is better understood, the same consists in the novel form, combination and arrangement of parts hereinafter more fully described, shown in the accompanying drawing and claimed.

In the drawing:—

Figure 1 is a fragmentary perspective view of a car wall equipped with longitudinally extending guide rails for the support of the adjustable decking structure, the latter being illustrated in vehicle supporting position;

Figure 2 is a perspective view of the decking structure in collapsed or folded formation;

Figure 3 is a detail sectional view taken on line 3—3 of Figure 1 showing one of the clamping members associated with the hanger and to which the vehicle supporting head is connected; and Figure 4 is a detail sectional view taken on line 4—4 of Figure 1 showing the clamping member in horizontal section.

To fulfill the foregoing objects, the side wall 5 of a freight car or other conveyance for the transportation of motor vehicles is equipped with a pair of upper guide rails 6 of angle formation and a lower guide rail 7 of angle formation, respectively arranged adjacent the roof and floor of the car, the upper guide rails 6 forming a channel in which a wheeled frame carried by the upper end of a hanger is mounted, the lower end of the hanger being guided within the lower rail 7 as will at once be apparent from an inspection of Figure 1.

The hanger 8 is of channel formation and carries a wheeled frame at its upper end that comprises a cross arm 9 secured thereto as at 10 with a wheel 11 journalled on the outer ends of the arm for riding upon the lower one of the guide rails 6, the upper one of the guide rails retaining the hanger and wheeled frame in postion therein. As stated, the lower end of the hanger 8 is confined by the lower guide rail 7 and said hanger may be shifted to the desired point lengthwise of the side wall 5 of the car.

A pair of clamping blocks 12 is carried by the hanger 8 and as illustrated is designed for a sliding interlocking connection with the channel formation of the hanger, each block 12 having a cutaway portion 13 with an ear 14 at each side of the cutaway portion at the outer side of the block in which a pin 15 is mounted for supporting a cam lever 16. The inner end of the cam lever 16 has a pivot connection 17 with arms 18 carried by clamping rollers 19 that are mounted upon a pin 20 within the channel formation of the hanger 8, the clamping rollers being moved into engagement with the inner faces of the flange sides 8a of the hanger 8.

The vehicle support comprises a socketed head 21 in which an axle end or other part of a vehicle is supported and said head has arm connections 22 with the clamping blocks 12, the opposite ends of the arms 22 having interfitting pin and lug connections 23 with the blocks and head. The head 21 carries wall brace arms 24, one at each side thereof, that has a head and interfitting lug connection 25 therewith, the outer ends of the brace arms 24 having interfitting pin and lug connections 26 with a wall plate 27, the wall plate to be secured to the side wall 5 of the car to prevent lateral movement of the head 21 relative to the hanger 8. The connection 25 between arm 24 and block 21 is such as to permit folding of the arms to occupy positions parallel with the arms 22 as shown in Figure 2 when the device is out of use.

From the above detailed description of the invention, it is believed that the construction and use thereof will at once be apparent, it being noted that the hanger 8 may be shifted to the desired position lengthwise of the car while the elevation of the head 21 is controlled by adjustment of the clamping blocks 12 as well as lateral adjustment thereof being accomplished by the blocks. When the decking structure has been placed in the proper position, the same is anchored against movement by the cam levers 16 clamping the blocks 12 to the hanger 8 while the plates 27 are secured to the side walls of the car. When the decking structure is out of use, the same may be folded to the position illustrated in Figure 2 for occupying a minimum of space, the blocks 12 being run to the opposite ends of the hanger and there retained by the cam levers 16 while the strap 28 carried by the lower arm 22 of the decking structure carries clamping rings 28a to be engaged with the wall brace arms 24, it being understood that the wall attaching plates 27 are permanently attached to the outer ends of the brace arms 24.

While there is herein shown and described the preferred embodiment of the invention it is nevertheless to be understood that minor changes may be made therein without departing from the spirit and scope of the invention as claimed.

I claim:—

1. In a collapsible deck structure, a hanger, blocks adjustably carried by the hanger and movable thereover toward opposite ends of the hanger, and a deck head associated with the blocks.

2. In a collapsible deck structure, a hanger, clamps adjustably carried by the hanger, a bracket arm carried by each clamp, a deck head carried by the free ends of the bracket arms and brace arms carried by the head.

3. In a collapsible deck structure, a hanger, a deck head carried by the hanger, and a track and roller support for the upper end of the hanger and a guide rail for the lower end of the hanger.

4. In a collapsible deck structure, a hanger, clamps adjustably carried by the hanger, a bracket arm carried by each clamp, a deck head carried by the free ends of the bracket arm, brace arms carried by the head, and a track and roller support for the hanger.

5. In decking apparatus of the character described, upper and lower guide rails, a roller frame movable over the upper rail, a hanger depending from the roller frame with its lower end associated with the lower rail, and a deck head carried by the hanger.

6. In decking apparatus of the character described, upper and lower guide rails, a roller frame movable over the upper rail, a hanger depending from the roller frame with its lower end associated with the lower rail, a deck head carried by the hanger, and the deck head being vertically adjustable on the hanger.

7. In decking apparatus of the character described, upper and lower guide rails, a roller frame movable over the upper rail, a hanger depending from the roller frame with its lower end associated with the lower rail, a deck head carried by the hanger, the support for the deck head including means carried by the hanger, and arms between said head and means.

8. In decking apparatus of the character described, upper and lower guide rails, a roller frame movable over the upper rail, a hanger depending from the roller frame with its lower end associated with the lower rail, a deck head carried by the hanger, the deck head being vertically adjustable on the hanger, the support for the deck head including means carried by the hanger, and arms between said head and means.

9. In combination with the wall of a car having guide rails thereon, of a hanger depending from the rail and movable thereover, a deck head adjustably supported on the hanger, and a lower guide rail on the car wall with which the lower end of the hanger is slidably associated.

10. In combination with the wall of a car having guide rails thereon, of a hanger depending from the rails and movable thereover, a deck head and adjustable support therefor on the hanger, the deck head and support including a block adjustably engaged with the hanger, an arm carried by each block, the deck head carried by the free ends of the arms, and wall brace arms carried by said head.

11. In combination with the wall of a car having guide rails thereon, of a hanger depending from the rails and movable thereover, a deck head and adjustable support therefor on the hanger, a lower guide rail on the car wall with which the lower end of the hanger is slidably associated, the deck head and support including a block adjustably engaged with the hanger, an arm carried by each block, the deck head carried by the free ends of the arms, and wall brace arms carried by said head.

12. In combination with the wall of a car having guide rails thereon, of a hanger depending from the rails and movable thereover, a deck head and adjustable support therefor on the hanger, the deck head and support including a block adjustably engaged with the hanger, an arm carried by each block, the deck head carried by the free ends of the arms, wall brace arms carried by said head, and said arms being foldable when out of use to occupy positions substantially parallel with the hanger.

13. In combination with the wall of a car having guide rails thereon, of a hanger depending from the rails and movable thereover, a deck head and adjustable support therefor on the hanger, a lower guide rail on the car wall with which the lower end of the hanger is slidably associated, the deck head and support including a block adjustably engaged with the hanger, an arm carried by each block, the deck head carried by the free ends of the arms, wall brace arms carried by said head, and said arms being foldable when out of use to occupy positions substantially parallel with the hanger.

In testimony whereof I affix my signature.

EDWARD S. EVANS.